US012315449B2

(12) United States Patent
Choi et al.

(10) Patent No.: US 12,315,449 B2
(45) Date of Patent: May 27, 2025

(54) DISPLAY DRIVING APPARATUS AND DISPLAY DEVICE INCLUDING THE SAME

(71) Applicant: LX SEMICON CO., LTD., Daejeon (KR)

(72) Inventors: Yun Hyeong Choi, Daejeon (KR); Hyeon Woon Shin, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/601,295

(22) Filed: Mar. 11, 2024

(65) Prior Publication Data

US 2024/0312409 A1 Sep. 19, 2024

(30) Foreign Application Priority Data

Mar. 14, 2023 (KR) ........................ 10-2023-0033163

(51) Int. Cl.
*G09G 3/3233* (2016.01)

(52) U.S. Cl.
CPC ... *G09G 3/3233* (2013.01); *G09G 2320/0233* (2013.01); *G09G 2330/021* (2013.01); *G09G 2360/16* (2013.01)

(58) Field of Classification Search
CPC ......... G09G 3/3233; G09G 2320/0233; G09G 2330/021; G09G 2360/16; G09G 2300/0842; G09G 2310/0232; G09G 2310/066; G09G 2320/0295; G09G 2320/0686; G09G 2340/06
See application file for complete search history.

(56) References Cited

U.S. PATENT DOCUMENTS 10,147,365 B2 * 12/2018 Jeon ..................... G09G 3/3648
11,250,770 B1 * 2/2022 Wu ..................... G09G 3/3208
2007/0013806 A1 * 1/2007 Kao ..................... H04N 23/81
348/E5.078

(Continued)

FOREIGN PATENT DOCUMENTS

KR 10-2015-0015235 A 2/2015
KR 10-2019-0000649 A 1/2019

OTHER PUBLICATIONS

Extended European Search Report dated May 31, 2024, issued for the corresponding European patent application 24161312.4, 9 pages.

*Primary Examiner* — Amy Onyekaba
(74) *Attorney, Agent, or Firm* — ROTHWELL, FIGG, ERNST AND MANBECK, P.C.

(57) ABSTRACT

Disclosed is a display driving apparatus. The display driving apparatus includes a distance calculator configured to calculate, for a plurality of pixels constituting a frame input to a display panel, distances between respective pixels and a central pixel, a gain calculator configured to divide the frame constituted by the plurality of pixels into an interest area and a non-interest area using the distances between respective pixels and the central pixel, and to determine a gain of each pixel in accordance with an area where the pixel is disposed, and a gain applier configured to generate pixel data using the gain of each pixel. Gains of the pixels disposed in the interest area have a constant value. Gains of the pixels disposed in the non-interest area are decreased in proportion to distances between the pixels in the non-interest area and the central pixel, respectively.

19 Claims, 9 Drawing Sheets

(56) References Cited

U.S. PATENT DOCUMENTS

2008/0043117 A1* 2/2008 Kim ........................ H04N 25/61
348/E5.078
2011/0090240 A1* 4/2011 Cohen ........................ G06T 5/20
345/589
2011/0122170 A1* 5/2011 Kim ..................... G09G 3/3406
345/102
2011/0221937 A1* 9/2011 Park ........................... G06T 5/20
348/E9.037
2011/0254947 A1* 10/2011 Kasahara ............. H04N 25/135
348/135
2013/0050529 A1* 2/2013 Murayama ............. H04N 25/61
348/E9.053
2013/0223735 A1* 8/2013 Yang ......................... G06T 5/80
382/167
2014/0063266 A1* 3/2014 Tsuzuki ............... H04N 25/683
348/187
2014/0063287 A1* 3/2014 Yamada ............... H04N 23/673
348/229.1
2014/0086507 A1* 3/2014 Lin ........................... G06T 5/90
382/274
2017/0034414 A1* 2/2017 Wang ................... H04N 23/741
2017/0236490 A1* 8/2017 Cheon ...................... G09G 5/10
345/691
2017/0345377 A1* 11/2017 Oh ....................... G09G 3/3291
2018/0151153 A1* 5/2018 Heo ..................... H04N 1/6008
2018/0182070 A1* 6/2018 Gal ........................... G06T 7/13
2018/0342189 A1* 11/2018 Xu ....................... G09G 3/3208
2020/0051215 A1* 2/2020 Smirnov ................... G06T 5/20
2020/0302580 A1* 9/2020 Lin ........................ H04N 23/10
2020/0342579 A1* 10/2020 Lin ........................... G06T 5/70
2020/0402477 A1* 12/2020 Jiang ........................ G06F 3/013
2021/0201849 A1* 7/2021 Choi .................... G09G 3/2007
2021/0225324 A1* 7/2021 Furihata ............... G09G 3/3233
2021/0360178 A1* 11/2021 Min .......................... G06T 5/94
2021/0390898 A1* 12/2021 Roh ..................... G09G 3/2003
2022/0254050 A1* 8/2022 Smirnov ................... G06T 7/90
2022/0342053 A1* 10/2022 Ohashi ................. H04N 23/671
2022/0360722 A1* 11/2022 Han .......................... G06T 7/80
2023/0005417 A1* 1/2023 Lee ...................... G09G 3/3275
2023/0290049 A1* 9/2023 Kawaguchi ............ H04N 7/147

* cited by examiner

DISPLAY DRIVING APPARATUS AND DISPLAY DEVICE INCLUDING THE SAME

This application claims the benefit of Korean Patent Application No. 10-2023-0033163, filed on Mar. 14, 2023, which is hereby incorporated by reference in its entirety as if fully set forth herein.

BACKGROUND

Field

The present disclosure relates to a display driving apparatus and a display device including the same.

Discussion of the Related Art

In accordance with recent progress of information-dependent society, various demands for display devices configured to display an image have increased. In recent years, accordingly, various flat display devices such as a liquid crystal display (LCD) device, a plasma display panel (PDP) device, and an organic light emitting diode display (OLED) device have been used. Among such display devices, the OLED device has characteristics of possibility of low-voltage driving, thinness, excellent viewing angle, and fast response time.

The OLED device includes a display panel including a plurality of pixels arranged in the form of a matrix. Each of the pixels includes a scan thin film transistor (TFT) configured to supply a data voltage of a data line in response to a gate signal of a gate line, and a driving TFT configured to adjust an amount of current supplied to an organic light emitting diode (OLED) in accordance with the data voltage supplied to a gate electrode thereof.

In order to enhance luminance of the OLED device, an amount of current flowing through the OLED of each pixel should be increased. However, as the amount of current flowing through the OLED of each pixel increases, there may be a drawback in that power consumption of the OLED device is increased.

SUMMARY

The present disclosure has been made to solve the above problems, and a technical task of the present disclosure is to provide a display driving apparatus configured to reduce power consumption of a display panel, and a display device including the same.

In order to accomplish the above and other objects, a display driving apparatus includes a distance calculator configured to calculate, for a plurality of pixels constituting a frame input to a display panel, distances between respective pixels and a central pixel, a gain calculator configured to divide the frame constituted by the plurality of pixels into an interest area and a non-interest area using the distances between respective pixels and the central pixel, and to determine a gain of each pixel in accordance with an area where the pixel is disposed, and a gain applier configured to generate pixel data using the gain of each pixel, wherein gains of the pixels disposed in the interest area have a constant value, and wherein gains of the pixels disposed in the non-interest area are decreased in proportion to distances between the pixels in the non-interest area and the central pixel, respectively.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
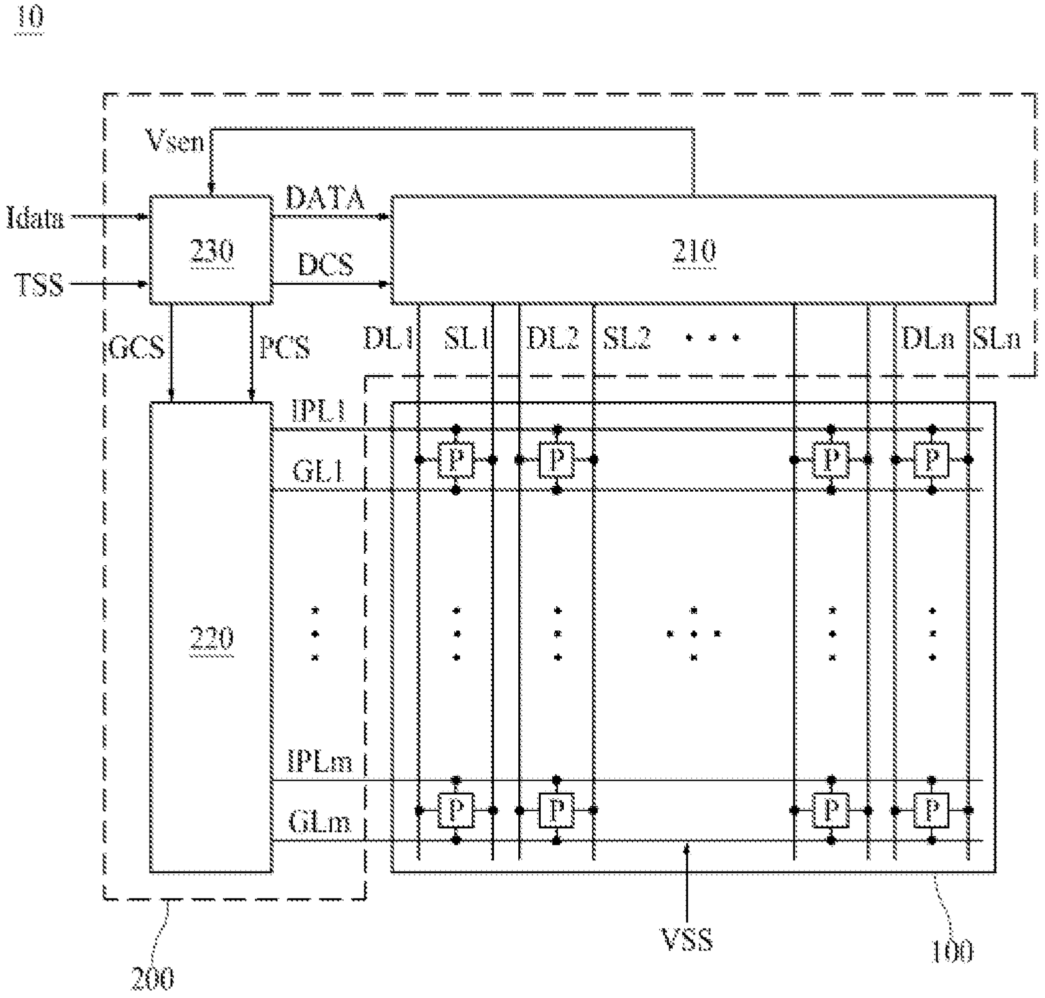
FIG. 1 is an illustrative diagram explaining a display device including a display driving apparatus according to an embodiment of the present disclosure.

Reference will now be made in detail to the exemplary embodiments of the present disclosure, examples of which are illustrated in the accompanying drawings. Wherever possible, the same reference numbers will be used throughout the drawings to refer to the same or like parts. In the following description, when a configuration and a function known to those skilled in the art are irrelevant to the essential configuration of the present disclosure, a detailed description thereof will be omitted. The terms described in the specification should be understood as follows.

Advantages and features of the present disclosure and methods for achieving the same will be made clear from embodiments described below in detail with reference to the accompanying drawings. The present disclosure may, however, be embodied in many different forms, and should not be construed as being limited to the embodiments set forth herein. Rather, these embodiments are provided so that this disclosure will be thorough and complete, and will fully convey the scope of the disclosure to those skilled in the art. Furthermore, the present disclosure is only defined by scopes of the claims.

In the drawings for explaining the exemplary embodiments of the present disclosure, for example, the illustrated shape, size, ratio, angle, and number are given by way of example, and thus, are not limitative of the present disclosure. Throughout the present specification, the same reference numerals designate the same constituent elements. In addition, in the following description of the present disclosure, a detailed description of known functions and configurations incorporated herein will be omitted when it may make the subject matter of the present disclosure rather unclear.

The terms "comprises" "includes" and/or "has", used in this specification, do not preclude the presence or addition of other elements unless used along with the term "only". The singular forms are intended to include the plural forms as well, unless the context clearly indicates otherwise.

In the interpretation of constituent elements included in the various embodiments of the present disclosure, the constituent elements are interpreted as including an error range even if there is no explicit description thereof.

In the description of the various embodiments of the present disclosure, when describing temporal relationships, for example, when the temporal relationship between two actions is described using "after", "subsequently", "next", "before", or the like, the actions may not occur in succession unless the term "directly" or "just" is used therewith.

It may be understood that, although the terms "first", "second", etc. may be used herein to describe various elements, these elements are not to be limited by these terms. These terms are merely used to distinguish one element from another. Therefore, in the present specification, an element indicated by "first" may be the same as an element indicated by "second" without exceeding the technical scope of the present disclosure, unless mentioned otherwise.

The term "at least one" should be understood as including all possible combinations which can be suggested from one or more relevant items. For example, the meaning of "at least one of a first item, a second item, or a third item" may be each one of the first item, the second item, or the third item and also be all possible combinations that can be suggested from two or more of the first item, the second item, and the third item.

The respective features of the various embodiments of the present disclosure may be partially or entirely coupled to and combined with each other, and various technical linkages and modes of operation thereof are possible. These various embodiments may be performed independently of each other, or may be performed in association with each other.

Hereinafter, a display driving apparatus according to an embodiment of the present disclosure and a display device including the same will be described in detail with reference to FIGS. 1 and 2.

FIG. 1 is an illustrative diagram explaining a display device including a display driving apparatus according to an embodiment of the present disclosure. FIG. 2 is a circuit diagram illustrating a pixel shown in FIG. 1.

Figure 2:
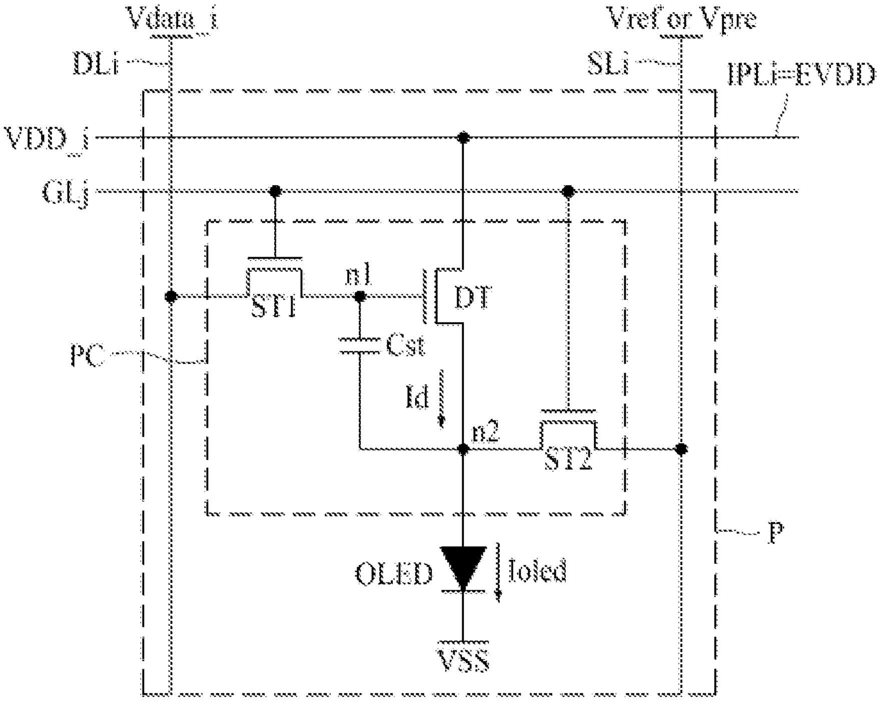
FIG. 2 is a circuit diagram illustrating a pixel shown in FIG. 1.

Referring to FIGS. 1 and 2, the display device according to the embodiment of the present disclosure, which is designated by reference numeral "10", is configured through inclusion of a display panel 100 and a display driving apparatus 200. The display driving apparatus 200 is configured through inclusion of a data driver 210, a gate driver 220, a timing controller 230, and a data compensator 240.

The display panel 100 may be an organic light emitting display panel without being limited thereto. The following description will be given in conjunction with the case in which the display panel 100 is an organic light emitting display panel.

The display panel 100 includes a plurality of pixels P arranged in the form of a matrix.

Each of the plurality of pixels P may be constituted by one of red, green, and blue pixels. Each of the plurality of pixels P is formed in a pixel region defined at the display panel 100. For such a configuration, at the display panel 100, the plurality of pixels P is formed in respective pixel regions defined by intersections of a plurality of gate lines GL (GL1 to GLm), a plurality of data lines DL (DL1 to DLn), a plurality of sensing lines SL (SL1 to SLn), and a plurality of first drive power lines IPL (IPL1 to IPLm).

Each of the pixels P is driven in a data charging period for charging a difference voltage Vdata-Vref between a data voltage Vdata and a reference voltage Vref in a capacitor Cst connected between a gate electrode and a source electrode of a driving transistor DT configured to receive first drive power VDD_i (i being an integer greater or equal to 1, but smaller than or equal to m) and an emission period, distinguished from the data charging period, for enabling a light emitting element OLED to emit light by data current Ioled flowing from a first drive power source VDD_i to a second drive power source VSS through the driving transistor DT in accordance with the charged voltage of the capacitor Cst.

The plurality of gate lines GL is formed to extend in parallel in a first direction of the display panel 100, for example, a horizontal direction. In this case, the plurality of gate lines GL may be constituted by pairs of first and second gate lines formed to be adjacent to each other and to receive gate signals, respectively, without being limited thereto. For convenience of description, the following description of the present disclosure will be given mainly in conjunction with an example in which the plurality of gate lines GL is configured such that each pixel P is associated with one gate line GL.

The plurality of data lines DL is formed to extend in a second direction of the display panel 100, for example, a vertical direction, such that each of the plurality of data lines DL intersects the plurality of gate lines GL. A data voltage Vdata from the display driving apparatus 200 is supplied to each data line DL. In this case, the data voltage Vdata to be supplied to each pixel P is a voltage compensated by an initial threshold voltage compensation value for compensating an initial threshold voltage Vth_in of the driving transistor DT of the pixel P, a mobility compensation value, and a compensation value based on image complexity and pixel position according to an embodiment of the present disclosure.

The plurality of sensing lines SL is formed to be parallel to the plurality of data lines DL, respectively. A reference voltage Vref or a precharging voltage Vpre is selectively supplied from the display driving apparatus 200 to each of the sensing lines SL. In this case, the reference voltage Vref may be supplied to each sensing line SL during a data charging period of each pixel P, and the precharging voltage Vpre may be supplied to each sensing line SL in a separate detection period for detecting a threshold voltage and mobility of the driving transistor DT of each pixel P.

The plurality of first drive power lines IPL may be formed to be parallel to the plurality of gate lines GL, respectively. The first drive power VDD_i, which has different voltage levels in the data charging period and the emission period, respectively, may be supplied from the display driving apparatus 200 to each first drive power line IPL. That is, a first drive power VDD_i having a first voltage level may be supplied to each first drive power line IPL in every data charging period, whereas a first drive power VDD_i having a second voltage level higher than the first voltage level may be supplied to each first drive power line IPL in every data emission period.

Each of the plurality of pixels P includes a pixel circuit PC configured to charge a difference voltage Vdata-Vref between a data voltage Vdata and a reference voltage Vref in a capacitor Cst during the data charging period and to supply a data current Ioled to a light emitting element OLED in accordance with a charged voltage of the capacitor Cst during the emission period.

Referring to FIG. 2, the pixel circuit PC of each pixel P is configured through inclusion of a first switching transistor ST1, a second switching transistor ST2, a driving transistor DT, and the capacitor Cst.

The first switching transistor ST1 includes a gate electrode connected to a gate line GLj (j being an integer greater than or equal to 1, but smaller than or equal to m), a first electrode connected to a data line DLi, and a second electrode connected to a first node n1 which is a gate electrode of the driving transistor DT. The first switching transistor ST1 configured as above supplies a data voltage Vdata supplied to the data line DLi to the gate electrode of the driving transistor DT, which is the first node n1, in accordance with a gate-on voltage level supplied to the gate line GLj.

The second switching transistor ST2 includes a gate electrode connected to the gate line GLj, a first electrode connected to a sensing line Si adjacent to the data line DLi, and a second electrode connected to a second node n1 which is a drain electrode of the driving transistor DT. The second switching transistor ST2 configured as above supplies a reference voltage Vref or a precharging voltage Vpre supplied to the sensing line Si to the source electrode of the driving transistor DT, which is the second node n2, in accordance with a gate-on voltage level supplied to the gate line GLj.

The capacitor Cst includes first and second electrodes connected between the first node n1, that is, the gate electrode of the driving transistor DT, and the second node n2, that is the source electrode of the driving transistor DT. The capacitor Cst configured as above charges a difference voltage between voltages respectively supplied to the first and second nodes n1 and n2, and then switches the driving transistor DT in accordance with the charged voltage.

The driving transistor DT includes the gate electrode, which is connected in common to the second electrode of the first switching transistor ST1 and the first electrode of the capacitor Cst, the source electrode, which is connected in common to the first electrode of the second switching transistor ST2, the second electrode of the capacitor Cst, and the light emitting element OLED, and the drain electrode, which is connected to a first drive power line IPLi. The driving transistor DT configured as above is driven by a voltage of the capacitor Cst in every emission period and, as such, controls an amount of current flowing through the light emitting element OLED in accordance with first drive power VDD_i.

The light emitting element OLED performs light emission in accordance with data current Ioled supplied from the pixel circuit PC, that is, the driving transistor DT, thereby emitting light proportional to the data current Ioled. For this function, the light emitting element OLED includes an anode (not shown) connected to the second node n2 of the pixel circuit PC, an organic layer (not shown) formed on the anode, and a cathode (not shown) formed on the organic layer to receive second drive power VSS. Here, the organic layer may have a structure of hole transport layer/organic emission layer/electron transport layer or a structure of hole injection layer/hole transport layer/organic emission layer/electron transport layer/electron injection layer. In addition, the organic layer may be configured through further inclusion of a functional layer configured to enhance luminous efficacy and life span of the organic emission layer.

The second drive power VSS is supplied to the cathode of the light emitting element OLED through a second drive power line (not shown).

The display driving apparatus 200 includes the data driver 210, the gate driver 220, and the timing controller 230, as described above.

The data driver 210 is connected to the plurality of data lines DL and, as such, may operate in a display mode and a detection mode in accordance with mode control of the timing controller 230. In the display mode, in every data charging period of each pixel P, the data driver 210 supplies a reference voltage Vref to a corresponding sensing line SL, converts pixel data DATA supplied from the timing controller 230 into a data voltage Vdata, and simultaneously supplies the data voltage Vdata to a corresponding data line DL. In this case, the pixel data DATA may be data compensated by an initial mobility compensation value, an initial threshold voltage compensation value, and a compensation value based on image complexity and a position of the pixel P.

The gate driver 220 may drive the plurality of gate lines GL and the plurality of first drive power lines IPL.

In every data charging period of each pixel P, the gate driver 220 supplies a gate signal of a gate-one voltage level to the plurality of gate lines GL, and simultaneously supplies first drive power VDD_i of a first voltage level to a corresponding drive power line IPLi. In every emission period of each pixel P, the gate driver 220 supplies a gate signal of a gate-off voltage level to the plurality of gate lines GL, and simultaneously supplies first drive power VDD_i of a second voltage level different from the first voltage level to the corresponding first drive power line IPLi. Here, the first voltage level may be lower than the second voltage level, or may be equal to or lower than that of the reference voltage Vref, without being limited thereto.

The timing controller 230 generates a data control signal DCS, a gate control signal GCS, and a power control signal PCS for driving of each pixel P connected to each gate line GL on a horizontal period basis, based on a timing synchronization signal TSS input from an external host, and controls operation modes of the data driver 210 and the gate driver 220 to be a display mode, using the generated signals. Here, the timing synchronization signal TSS may be a vertical synchronization signal Vsync, a horizontal synchronization signal Hsync, a data enable signal DE, a clock DCLK, etc. In addition, the gate control signal GCS may be constituted by a data start signal and a plurality of clock signals, and the data control signal DCS may be constituted by a data start signal, a data shift signal, and a data output signal. In addition, the power control signal PCS may be constituted by a power start signal and a power shift signal.

As described above, the timing controller 230 supplies, to the data driver 210, pixel data DATA obtained after compensation of the input data Idata in a data compensator 240 which will be described later. In this case, a red pixel, a green pixel, and a blue pixel may constitute one unit pixel and, as such, the input data Idata may include red input data Idata_R, green input data Idata_G or blue input data Idata_B for each unit pixel.

In accordance with an embodiment of the present disclosure, the display driving apparatus 200 further includes a data compensator 240 (FIG. 3) configured to compensate input data Idata of each pixel in accordance with complexity and a position of each pixel P for each frame of an image. In this case, the data compensator 240 according to the embodiment of the present disclosure may be included in the timing controller 230, may be included in a chip including all of the data driver 210, the gate driver 220, and the timing controller 230 as described above, or may be included in a chip including at least one of the data driver 210, the gate driver 220, or the timing controller 230. The data compensator 240 will be described later in detail with reference to FIGS. 3 to 8.

Hereinafter, the data compensator according to the embodiment of the present disclosure will be described in detail with reference to FIGS. 3 to 8.

Figure 3:
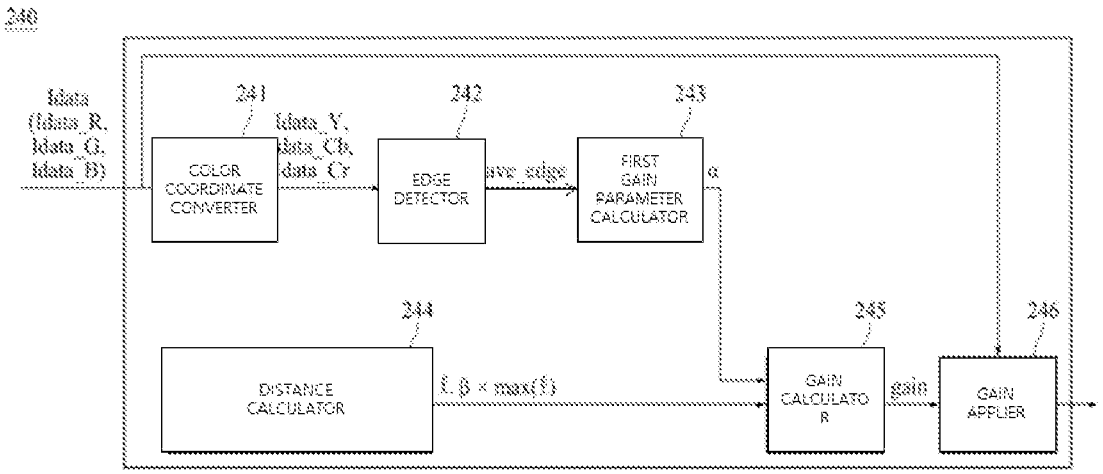
FIG. 3 is a block diagram of a data compensator in the display driving apparatus according to the embodiment of the present disclosure.
Figure 4:
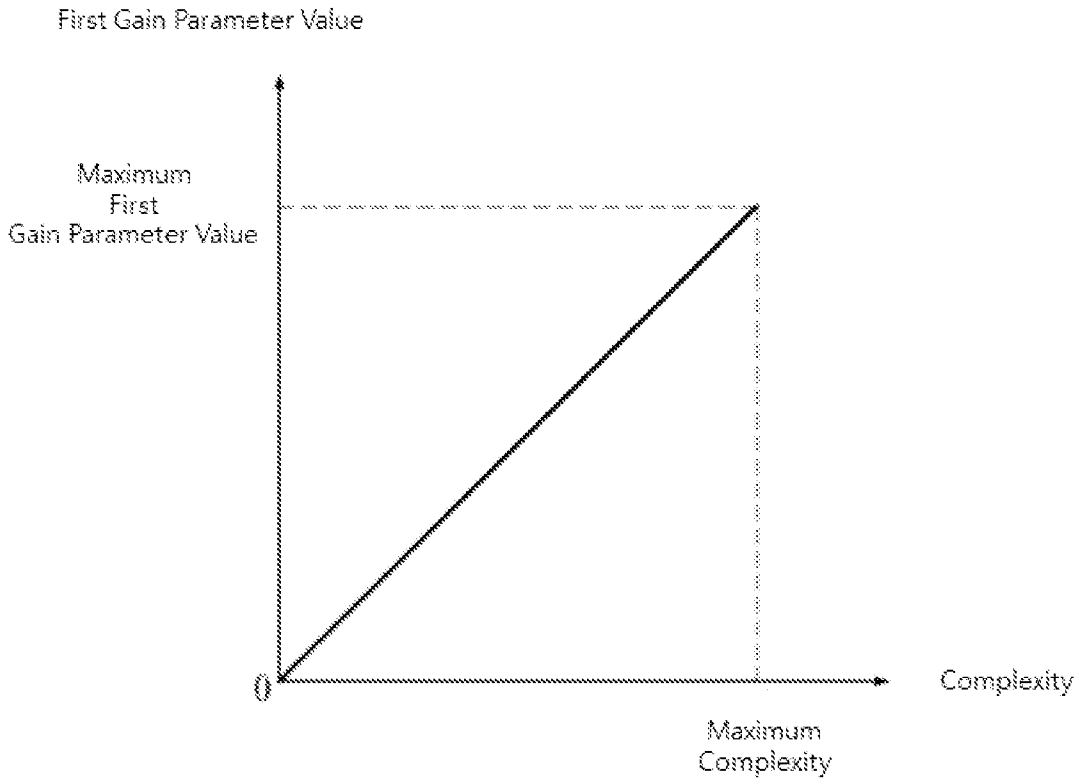
FIG. 4 is a graph depicting a first gain parameter value for complexity according to an embodiment of the present disclosure.
Figure 5:
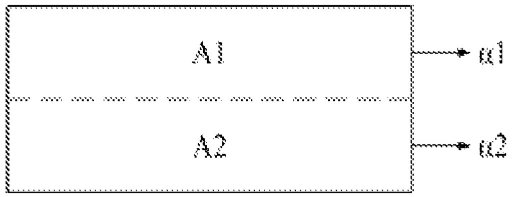
FIG. 5 is a view showing a first area and a second area distinguished from each other based on distances thereof from a central pixel in accordance with an embodiment of the present disclosure.
Figure 6:
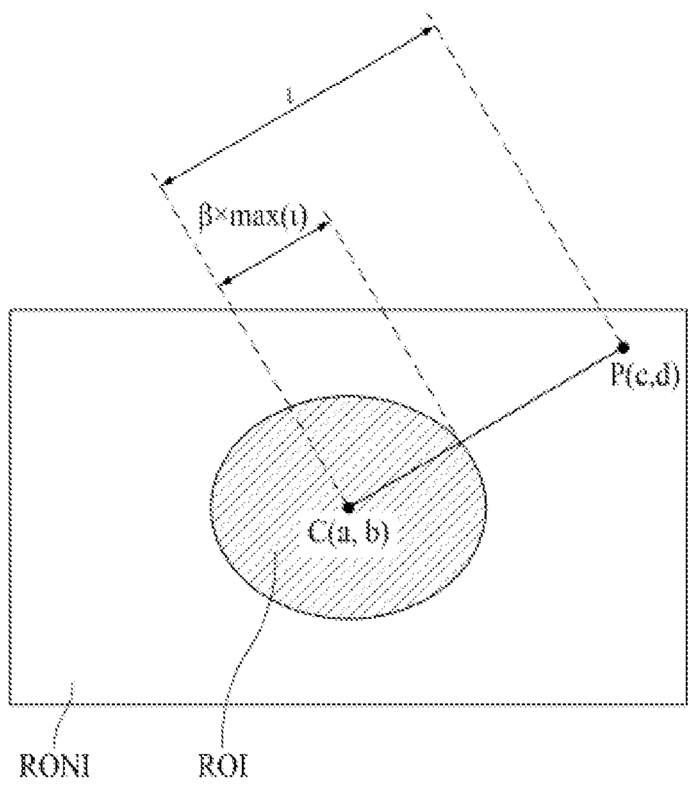
FIG. 6 is a graph depicting a gain based on a distance from a central pixel in accordance with another embodiment of the present disclosure.
Figure 7:
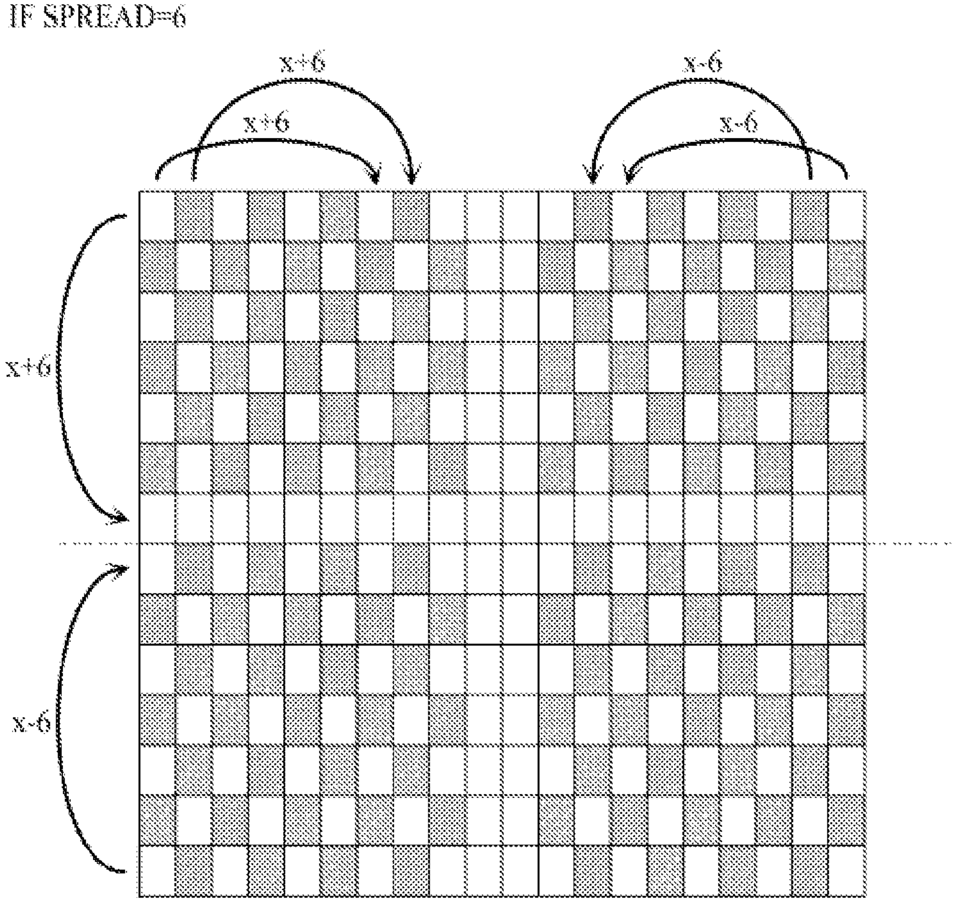
FIG. 7 is a view explaining application of burring to a gain according to another embodiment of the present disclosure.
Figure 8:
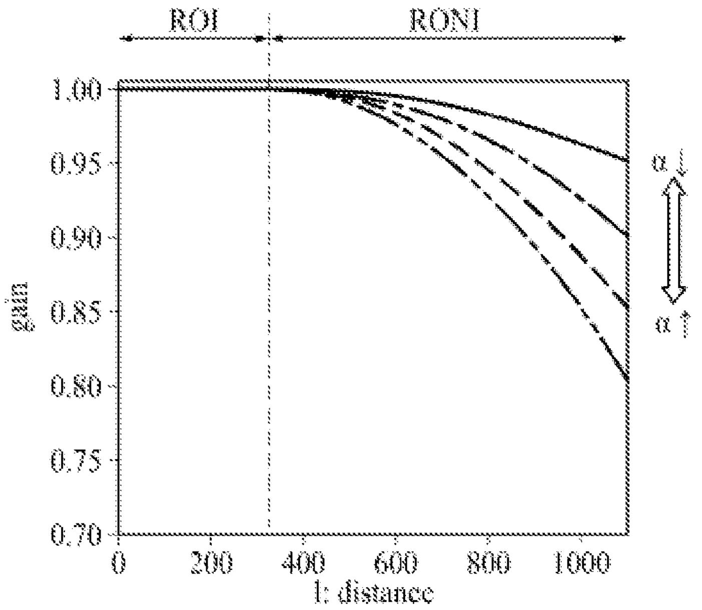
FIG. 8 is a graph depicting a variation in gain based on a distance from a central pixel according to an embodiment of the present disclosure.

FIG. 3 is a block diagram of the data compensator in the display driving apparatus according to the embodiment of the present disclosure. FIG. 4 is a graph depicting a first gain parameter value for complexity according to an embodiment of the present disclosure. FIG. 5 is a view showing a first area and a second area distinguished from each other based on distances thereof from a central pixel in accordance with an embodiment of the present disclosure. FIG. 6 is a view explaining application of respective first gain parameters of different values to different areas according to another embodiment of the present disclosure. FIG. 7 is a view explaining application of burring to a gain according to another embodiment of the present disclosure. FIG. 8 is a graph depicting a variation in gain based on a distance from a central pixel according to an embodiment of the present disclosure.

As described above, the data compensator 240 calculates pixel data DATA by compensating input data Idata of each pixel P in accordance with complexity and a position of the pixel P of an image displayed in each frame. In detail, the data compensator 240 calculates complexity for each frame of an image, and calculates a distance between each pixel and a central pixel C(a,b), which is a pixel disposed at a center of the frame, thereby compensating input data Idata of the pixel to generate pixel data DATA. In this case, the data compensator 240 may calculate a gain of each pixel for each frame.

In detail, referring to FIG. 3, the data compensator 240 includes a color coordinate converter 241, an edge detector 242, a first gain parameter calculator 243, a distance calculator 244, a gain calculator 245, and a gain applier 246.

The color coordinate converter 241 converts input data of each unit pixel corresponding to color coordinates in an RGB color space, that is, red input data Idata_R, green input data Idata_G, and blue input data Idata_B, into color coordinates in an YCbCr color space. In detail, the color coordinate converter 241 converts red input data Idata_R, green input data Idata_G, and blue input data Idata_B of each unit pixel constituting one frame into Y input data Idata_Y, Cb input data Idata_Cb, and Cr input data Idata_Cr.

The edge detector 242 detects an average number of edges ave_edge of each frame using at least one of Y input data Idata_Y, Cb input data Idata_Cb, or Cr input data Idata_Cr, in order to calculate complexity for the frame. For example, the edge detector 242 may detect an average number of edges ave_edge of each frame using Y input data Idata_Y. Here, edges mean regions where brightness is abruptly varied, that is, boundaries. As the number of edges detected in a frame decreases, the number of contour lines is decreased and, as such, it may be regarded that complexity of the frame is low. On the other hand, as the number of edges detected in a frame increases, the number of contour lines is increased and, as such, it may be regarded that complexity of the frame is high.

In detail, the edge detector 242 detects the number of edges included in each frame by inputting at least one of Y input data Idata_Y, Cb input data Idata_Cb, or Cr input data Idata_Cr to an edge detection filter. For example, the edge detector 242 may detect the number of edges included in one frame by inputting Y input data Idata_Y of the frame to the edge detection filter. In this case, the edge detection filter may be at least one of a differential filter, a Sobel filter, a Scharr filter, or a Canny edge detection filter without being limited thereto, and may be at least one of filters capable of detecting edges.

The edge detector 242 calculates the average number of edges ave_edge by dividing the number of edges detected on a frame basis in the edge detection filter by the total number of pixels.

The first gain parameter calculator 243 calculates a first gain parameter α for calculation of a gain. In detail, the first gain parameter calculator 243 calculates a first gain parameter α for each frame using the average number of edges ave_edge of the frame detected in the edge detector 242. As shown in FIG. 4, the first gain parameter α is linearly proportional to image complexity of each frame. Since the image complexity of each frame is proportional to the average number of edges ave_edge of the frame, and the first gain parameter α of the frame is proportional to the image complexity of the frame, the first gain parameter α of the frame is proportional to the average number of edges ave_edge of the frame. That is, the first gain parameter α for the average number of edges of each frame may be calculated in accordance with a linear proportional expression. In other words, as the average number of edges ave_edge of each frame becomes greater, the value of the first gain parameter α may become greater, whereas, as the average number of edges ave_edge of each frame becomes smaller, the value of the first gain parameter α may become smaller.

In accordance with another embodiment of the present disclosure, as shown in FIG. 5, the edge detector 242 may divide each frame into a first area A1 and a second area A2, and may then calculate the average number of edges ave_edge of each of the first area A1 and the second area A2. For example, as shown in FIG. 5, under the condition that an upper area of each frame is defined as a first area A1, and a lower area of the frame is defined as a second area A2, the edge detector 242 may calculate respective average numbers of edges ave_edge of the first area A1 and the second area A2. Of course, the present disclosure is not limited to the above-described conditions. For example, the first area A1 and the second area A2 may be defined by left and right areas of the frame, respectively, and each of the first area A1 and the second area A2 may be defined by an area including at least one pixel.

In detail, when the average number of edges ave_edge of the first area A1 is less than a reference average number of edges ref_edge (ave_edge<ref_edge), the first gain parameter calculator 243 determines a value of the first gain parameter α such that a gain of the first area A1 has a value of 1 in order to prevent luminance of the first area A1 from being decreased. On the other hand, when the average number of edges ave_edge of the first area A1 is not less than the reference average number of edges ref_edge (ave_edge≥ref_edge), the first gain parameter calculator 243 determines a value of the first gain parameter α such that a gain of the first area A1 has a value less than 1 in order to decrease luminance of the first area A1. In addition, when the average number of edges ave_edge of the second area A2 is less than the reference average number of edges ref_edge (ave_edge<ref_edge), the first gain parameter calculator 243 determines a value of the first gain parameter α such that a gain of the second area A2 has a value of 1 in order to prevent luminance of the second area A2 from being decreased. On the other hand, when the average number of edges ave_edge of the second area A2 is not less than the reference average number of edges ref_edge (ave_edge≥ref_edge), the first gain parameter calculator 243 determines a value of the first gain parameter α such that a gain of the second area A2 has a value less than 1 in order to decrease luminance of the second area A2. For example, the first gain parameter calculator 243 determines a value of the first gain parameter α such that a gain of the first area A1 has a value of 1, thereby preventing luminance of the first area A1 from being decreased, when the average number of edges ave_edge of the first area A1 is less than a reference average number of edges ref_edge (ave_edge<ref_edge), whereas the first gain parameter calculator 243 determines a value of the first gain parameter α such that a gain of the second area A2 has a value less than 1, thereby decreasing luminance of the second area A2, when the average number of edges ave_edge of the second area A2 is not less than the reference average number of edges ref_edge (ave_edge≥ref_edge).

The distance calculator 244 calculates distances between respective pixels constituting a frame and a central pixel C(a,b) of the frame, and then calculates, as a maximum distance value max(l), a maximum one of the calculated distances between respective pixels constituting the frame and the central pixel C(a,b). For example, as shown in FIG. 6, the distance calculator 244 calculates distances l between respective pixels P(c,d) and the central pixel C(a,b), and calculates a maximum distance value max(l) which is a maximum one of the distances l between respective pixels P(c,d) and the central pixel C(a,b).

In accordance with another embodiment of the present disclosure, in order to minimize recognition of a variation in gain according to a pixel position by the user, the distance calculator 244 converts a gain of one pixel into a gain of another pixel spaced apart from the one pixel by a predetermined distance SPREAD in at least one of an x-axis direction or a y-axis direction, and performs blurring for the converted gain. In detail, the distance calculator 244 converts coordinates of one pixel into coordinates of another pixel spaced apart from the one pixel by a predetermined distance in at least one of an x-axis direction or a y-axis direction, and may then calculate a distance l between each of the pixels and a central pixel C. For example, in order to convert a gain of one pixel into another pixel spaced apart from a predetermine distance SPREAD in the x-axis direction, the distance calculator 244 may convert coordinates of a pixel disposed at a position (0,0) into coordinates (6,0), and may then calculate a distance l from the central pixel C(a,b) with reference to the converted coordinates (6,0). Alternatively, in order to convert a gain of one pixel into another pixel spaced apart from the one pixel by a predetermine distance SPREAD in both the x-axis direction and the y-axis direction, as shown in FIG. 7, the distance calculator 244 may convert coordinates of a pixel disposed at a position (0,0) into coordinates (6,6), and may then calculate a distance l from the central pixel C(a,b) with reference to the converted coordinates (6,6).

In addition, the distance calculator 244 may convert coordinates of a pixel disposed at an odd position in the x-axis direction or the y-axis direction into coordinates of a pixel spaced apart from the odd pixel by a predetermined distance SPREAD in the x-axis direction or the y-axis direction without converting coordinates of a pixel disposed at an even position in the x-axis direction or the y-axis direction. For example, the distance calculator 244 may convert coordinates of a pixel disposed at a position (0,0) into coordinates (6,6) of a pixel spaced apart from the former pixel in the x-axis direction and the y-axis direction by a predetermined distance of 6, and may not convert coordinates of a pixel disposed at a position (1,0). Of course, the present disclosure is not limited to the above-described conditions, and the distance calculator 244 may convert coordinates of a pixel disposed at an even position in the x-axis direction or the y-axis direction into coordinates of a pixel spaced apart from the even pixel by a predetermined distance SPREAD in the x-axis direction or the y-axis direction without converting coordinates of a pixel disposed at an odd position in the x-axis direction or the y-axis direction.

In addition, as shown in FIG. 7, the distance calculator 244 may convert coordinates of one pixel into coordinates of another pixel spaced apart from the one pixel by a predetermined distance SPREAD in one of a +x-axis direction and a −x-axis direction and in one of a +y-axis direction and a −y-axis direction in accordance with a position of the one pixel. In detail, the distance calculator 244 may convert coordinates of each of pixels disposed at left upper sides of a central pixel C disposed at a center of a frame with reference to the central pixel C into coordinates of a pixel spaced apart from the left upper pixel by a predetermined distance SPREAD in the +x-axis direction or the +y-axis direction, may convert coordinates of each of pixels disposed at right upper sides of the central pixel C into coordinates of a pixel spaced apart from the right upper pixel by the predetermined distance SPREAD in the −x-axis direction or the +y-axis direction, may convert coordinates of each of pixels disposed at left lower sides of the central pixel C into coordinates of a pixel spaced apart from the left lower pixel by the predetermined distance SPREAD in the +x-axis direction or the −y-axis direction, and may convert coordinates of each of pixels disposed at right lower sides of the central pixel C into coordinates of a pixel spaced apart from the right lower pixel by the predetermined distance SPREAD in the −x-axis direction or the −y-axis direction.

When a gain is calculated through conversion of coordinates of a pixel in accordance with another embodiment of the present disclosure, the gain may be blurred because a position to which the gain is applied is varied in accordance with a converted position of the pixel. As a result, it may be possible to avoid recognition of a contour generated as a variation in gain caused by the position of the pixel is visible.

The gain calculator 245 determines a gain of each of pixels constituting a frame using the first gain parameter α, the distance l between the pixel and the central pixel C(a,b), a maximum one of distances between respective pixels and the central pixel C(a,b), that is, the maximum distance value max(l), and a predetermined second gain parameter β.

The gain calculator 245 determines an interest area ROI and a non-interest area RONI using the distance l between each pixel and the central pixel C(a,b), a maximum one of distances between respective pixels and the central pixel C(a,b), that is, the maximum distance value max(l), and the predetermined second gain parameter β. As shown in FIG. 6, the gain calculator 245 may determine, from among pixels constituting a frame, pixels P(c,d) respectively spaced apart from the central pixel C(a,b) by distances smaller than a value obtained by multiplying the second gain parameter β by the maximum distance value max(l) to be included in the interest area ROI, whereas the gain calculator 245 may determine, from among pixels constituting a frame, pixels P(c,d) respectively spaced apart from the central pixel C(a,b) by distances greater than or equal to the value obtained by multiplying the second gain parameter β by the maximum distance value max(l) to be included in the non-interest area RONI.

In accordance with the following Expression 1, the gain calculator 245 determines gains of pixels disposed in the interest area ROI to be 1, and calculates gains of pixels disposed in the non-interest area RONI using the first gain parameter α, distances l between respective pixels and the central pixel C(a,b), a maximum one of distances between respective pixels and the central pixel C(a,b), that is, the maximum distance value max(l), and the predetermined second gain parameter β. In detail, in association with the non-interest area RONI, the gain calculator 245 may determine a variation in gain with respect to the distance l between each pixel and the central pixel C(a,b), based on the first gain parameter α, in accordance with Expression 1. The gain calculator 245 may calculate a gain decreasing in inverse proportion to the distance l between each pixel and the central pixel C(a,b). In particular, in accordance with an embodiment of the present disclosure, as shown in FIG. 8, in association with the non-interest area RONI, the gain calculator 245 may determine a gain decrease according to an increase in the distance between each pixel and the central pixel C(a,b) to be greater as the first gain parameter α becomes greater, and may determine the gain decrease according to the distance between each pixel and the central pixel C(a,b) to be smaller as the first gain parameter α becomes smaller. That is, a decrease in gain in the non-interest area RONI may become greater in proportion to the first gain parameter α in accordance with an increase in the distance from the central pixel C(a,b).

$$G = \begin{cases} 1, & l < \beta \times \max(l) \\ \frac{-\alpha}{(\max(l))^2}(l - \beta \times (\max(l))^2 + 1, & l \geq \beta \times \max(l) \end{cases} \quad \text{[Expression 1]}$$

In accordance with the embodiment of the present disclosure, luminance of pixels disposed in the interest area ROI may be maintained, whereas luminance of pixels disposed in the non-interest area RONI may be decreased and, as such, it may be possible to reduce power consumption in the non-interest area RONI which has low visibility to the user.

In particular, since the user has difficulty recognizing a variation in luminance for an image having high complexity, but may easily recognize a variation in luminance for an image having low complexity, a variation in luminance is increased when complexity of an image is high, and is decreased when complexity of the image is low in accordance with the embodiment of the present disclosure. Accordingly, when the user has difficulty recognizing a variation in luminance because complexity of an image is high, it may be possible to reduce power consumption of the display panel 100 by decreasing luminance.

The gain applier 246 calculates pixel DATA by multiplying input data Idata input to the data compensator 240 for each pixel by a gain calculated in the gain calculator 245. In this case, the edge detector 242 may calculate a first gain parameter α of an n-th frame using input data of the n-th frame, the gain calculator 245 may calculates a gain of each pixel using the first gain parameter α of the n-the frame, and the gain applier 246 may calculate pixel data DATA of an n+1-th frame by multiplying input data of the n+1-th frame by the gain of each pixel calculated using the first gain parameter α of the n-th frame. Of course, the present disclosure is not limited to the above-described conditions, and the gain applier 246 may also calculate pixel data DATA of the n-th frame by multiplying input data of the n-th frame by the gain of each pixel calculated using the first gain parameter α of the n-th frame.

Hereinafter, a method of calculating complexity of an image and a gain based on a distance from a central pixel in accordance with an embodiment of the present disclosure will be described in detail with reference to FIG. 9.

Figure 9:
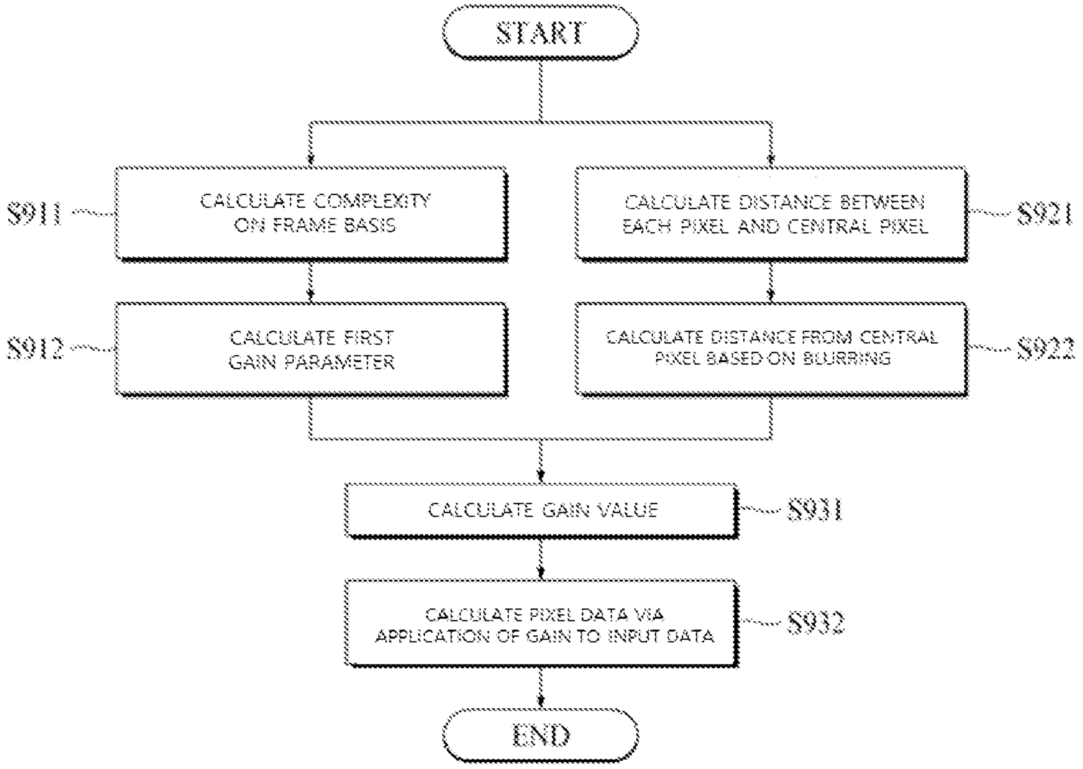
FIG. 9 is a flowchart of a method of calculating complexity of an image and a gain based on a distance from a central pixel in accordance with an embodiment of the present disclosure.

FIG. 9 is a flowchart of a method of calculating complexity of an image and a gain based on a distance from a central pixel in accordance with an embodiment of the present disclosure.

First, complexity of an image is calculated on a frame basis (S910). In detail, in the color coordinate converter 241, red input data Idata_R, green input data Idata_G, and blue input data Idata_B of each unit pixel constituting one frame are converted into Y input data Idata_Y, Cb input data Idata_Cb, and Cr input data Idata_Cr. In the edge detector 242, an average number of edges ave_edge of each frame of the image is detected using at least one of Y input data Idata_Y, Cb input data Idata_Cb, or Cr input data Idata_Cr.

Thereafter, a first gain parameter α is calculated (S912). In detail, in the first gain parameter calculator 243, the first gain parameter α is calculated using the average number of edges ave_edge. In this case, the first gain parameter α may be linearly proportional to the average number of edges ave_edge.

Although not shown, in accordance with another embodiment of the present disclosure, in the edge detector 242, each frame may be divided into a first area A1 and a second area A2, and an average number of edges ave_edge of each area may then be calculated. In the first gain parameter calculator 243, a first gain parameter α may be calculated using the average number of edges ave_edge detected for each area. In this case, when the average number of edges ave_edge of each of the first area A1 and the second area A2 is less than a reference average number of edges ref_edge (ave_edge<ref_edge), the first gain parameter α may be determined, in the first gain parameter calculator 243, to be a value preventing a decrease in the luminance of the corresponding area. On the other hand, when the average number of edges ave_edge of each of the first area A1 and the second area A2 is not less than the reference average number of edges ref_edge (ave_edge≥ref_edge), the first gain parameter α may be determined, in the first gain parameter calculator 243, to be a value decreasing the luminance of the corresponding area in accordance with the average number of edges ave_edge of the corresponding area.

In addition, a distance between each pixel and a central pixel C(a,b) is calculated (S921). In detail, the distance calculator 244 calculates distances between respective pixels constituting a frame and a central pixel C(a,b) of the frame, and then calculates, as a maximum distance value max(l), a maximum one of the calculated distances between respective pixels constituting the frame and the central pixel C(a,b).

Thereafter, a distance from the central pixel C(a,b) according to blurring is calculated (S922). As described above, in accordance with another embodiment of the present disclosure, in the distance calculator 244, coordinates of one pixel are converted into coordinates of another pixel spaced apart from the one pixel by a predetermined distance in at least one of an x-axis direction or a y-axis direction, and a distance l between each pixel and a central pixel C may then be calculated. In addition, the distance calculator 244 may convert coordinates of a pixel disposed at an odd position in the x-axis direction or the y-axis direction into coordinates of a pixel spaced apart from the odd pixel by a predetermined distance SPREAD in the x-axis direction or the y-axis direction without converting coordinates of a pixel disposed at an even position in the x-axis direction or the y-axis direction. In addition, the distance calculator 244 may convert coordinates of one pixel into coordinates of another pixel spaced apart from the one pixel by a predetermined distance SPREAD in one of a +x-axis direction and a −x-axis direction and in one of a +y-axis direction and a −y-axis direction in accordance with a position of the one pixel.

Subsequently, a gain value is calculated (S931). In detail, in the gain calculator 245, an interest area ROI and a non-interest area RONI are determined using the distance l between each of pixels constituting a frame and a central pixel C(a,b), a maximum one of distances between respective pixels and the central pixel C(a,b), that is, the maximum distance value max(l), and a predetermined second gain parameter β. In accordance with Expression 1, the gain calculator 245 then determines gains of pixels disposed in the interest area ROI to be 1, and calculates gains of pixels disposed in the non-interest area RONI using the first gain parameter α, distances l between respective pixels and the central pixel C(a,b), a maximum one of distances between respective pixels and the central pixel C(a,b), that is, the maximum distance value max(l), and the predetermined second gain parameter β. In particular, in the gain calculator 245, a gain decrease according to an increase in the distance between each pixel and the central pixel C(a,b) is determined to be greater as the first gain parameter α becomes greater, and may determine the gain decrease according to the distance between each pixel and the central pixel C(a,b) to be smaller as the first gain parameter α becomes smaller. That is, a decrease in gain in the non-interest area RONI may become greater in proportion to the first gain parameter α in accordance with an increase in the distance from the central pixel C(a,b).

Thereafter, pixel data DATA is calculated by applying the gain to the input data Idata (S932). In detail, the gain applier 246 calculates pixel data DATA by multiplying input data Idata input to the data compensator 240 for each pixel by a gain calculated in the gain calculator 245. In this case, the edge detector 242 may calculate a first gain parameter α of an n-th frame using input data of the n-th frame, the gain calculator 245 calculates a gain of each pixel using the first gain parameter α of the n-the frame, and the gain applier 246 may calculate pixel data DATA of an n+1-th frame by multiplying input data of the n+1-th frame by the gain of each pixel calculated using the first gain parameter α of the n-the frame. Of course, the present disclosure is not limited to the above-described conditions, and the gain applier 246 may also calculate pixel data DATA of the n-th frame by multiplying input data of the n-th frame by the gain of each pixel calculated using the first gain parameter α of the n-th frame.

In accordance with the embodiment of the present disclosure, luminance of pixels disposed in the interest area ROI may be maintained, whereas luminance of pixels disposed in the non-interest area RONI may be decreased and, as such, it may be possible to reduce power consumption in the non-interest area RONI which has low visibility to the user.

Since the user has difficulty recognizing a variation in luminance for an image having high complexity, but may easily recognize a variation in luminance for an image having low complexity, a variation in luminance is increased when complexity of an image is high, and is decreased when complexity of the image is low in accordance with the embodiment of the present disclosure. Accordingly, when the user has difficulty recognizing a variation in luminance because complexity of an image is high, it may be possible to reduce power consumption of the display panel 100 by decreasing luminance.

As apparent from the above description, the display driving apparatus and the display device including the same according to each of the embodiments of the present disclosure may reduce power consumption.

While the present disclosure has been particularly shown and described with reference to exemplary embodiments thereof, these embodiments are only proposed for illustrative purposes, and it will be apparent to those skilled in the art that various changes in form and details may be made without departing from the essential characteristics of the present disclosure.

It will be appreciated that at least a part of the methods and procedures disclosed herein can be implemented using one or more computer programs or components. These components may be provided as a series of computer instructions on any conventional computer readable medium or machine readable medium, including volatile or non-volatile memory. The instructions may be provided as software or firmware, and/or may be implemented in whole or in part in hardware components such as ASICs, FPGAS, DSPs or any other similar devices. The instructions may be configured to be executed by one or more processors, which, when executing the series of computer instructions, perform or facilitate the performance of all or part of the disclosed methods and procedures.

Therefore, the exemplary embodiments should be considered in a descriptive sense only and not for purposes of limitation. The scope of the disclosure is defined not by the detailed description of the disclosure but by the appended claims, and encompasses all modifications and equivalents that fall within the scope of the appended claims.

What is claimed is:

1. A display driving apparatus comprising:

a distance calculator configured to calculate, for a plurality of pixels constituting a frame input to a display panel, distances between respective pixels and a central pixel;

a gain calculator configured to divide the frame constituted by the plurality of pixels into an interest area and a non-interest area using the distances between the respective pixels and the central pixel, and to determine a gain of each pixel of the plurality of pixels in accordance with an area where the each pixel is disposed; and a gain applier configured to generate pixel data using the gain of each pixel of the plurality of pixels, wherein gains of the pixels disposed in the interest area have a constant value, wherein gains of the pixels disposed in the non-interest area are decreased in proportion to distances between the respective pixels in the non-interest area and the central pixel, and wherein the distance calculator is configured to convert a gain of one pixel into a gain of another pixel spaced apart from the one pixel by a predetermined distance in at least one of an x-axis direction or a y-axis direction.

2. The display driving apparatus according to claim 1, wherein the gain calculator is configured to determine the interest area and the non-interest area using the distances between the respective pixels and the central pixel and a maximum distance value of the distances between the respective pixels and the central pixel.

3. The display driving apparatus according to claim 1, further comprising:

an edge detector configured to calculate, for the frame, an average number of edges using an edge detection filter; and a first gain parameter calculator configured to calculate a first gain parameter using the average number of edges in the frame, wherein the decrease of the gains of the pixels disposed in the non-interest area according to the distance between each pixel in the non-interest area and the central pixel is proportional to the first gain parameter.

4. The display driving apparatus according to claim 1, further comprising:

a color coordinate converter configured to convert red input data, green input data, and blue input data of each pixel of the plurality of pixels constituting the frame into Y input data, Cb input data, and Cr input data; and an edge detector configured to input at least one of the Y input data, the Cb input data, and the Cr input data to an edge detection filter, thereby detecting a number of edges included in the frame.

5. The display driving apparatus according to claim 1, further comprising:

an edge detector configured to calculate, for the frame, an average number of edges using an edge detection filter; and a first gain parameter calculator configured to calculate a first gain parameter using the average number of edges in the frame, wherein the gain calculator is configured to determine the interest area and the non-interest area using the distances between the respective pixels and the central pixel and a maximum distance value of the distances between the respective pixels and the central pixel;

wherein the gain calculator is configured to determine the gains of the pixels disposed in the interest area to have a value of 1, and wherein the gain calculator is configured to calculate the gains of the pixels disposed in the non-interest area using the first gain parameter, the distances between the respective pixels and the central pixel, a maximum distance value of the distances between the respective pixels and the central pixel, and a predetermined second gain parameter.

6. The display driving apparatus according to claim 1, further comprising:

an edge detector configured to calculate, for the frame, an average number of edges using an edge detection filter; and a first gain parameter calculator configured to calculate a first gain parameter using the average number of edges in the frame.

7. The display driving apparatus according to claim 6, wherein the gain calculator is configured to calculate the gain of each pixel using the first gain parameter (α), the distance (l) between the each pixel and the central pixel, a maximum distance value (max(l)) of the distances between the respective pixels and the central pixel, and a predetermined second gain parameter (β) in accordance with Expression 1:

$$G = \begin{cases} 1, & l < \beta \times \max(l) \\ \frac{-\alpha}{(\max(l))^2}\left(l - \beta \times (\max(l))^2 + 1, & l \geq \beta \times \max(l) \end{cases} . \quad \text{[Expression 1]}$$

8. The display driving apparatus according to claim 1, further comprising:

an edge detector configured to calculate, for the frame, an average number of edges using an edge detection filter; and a first gain parameter calculator configured to calculate a first gain parameter using the average number of edges in the frame, wherein the edge detector is configure to divide the frame into a first area and a second area each comprising at least one pixel, and to calculate an average number of edges of the first area and an average number of edges of the second area, and wherein the first gain parameter calculator is configured to calculate the first gain parameter for the first area and a second gain parameter for the second area using the average number of edges of the first area and the average number of edges of the second area, respectively.

9. The display driving apparatus according to claim 8, wherein:

as a result of the average number of edges of the first area or the second area being less than a reference average number of edges, the first gain parameter calculator is configured to determine a value of the first gain parameter for the first area such that a gain of the first area has a value of 1 or determine a value of the second gain parameter for the second area such that a gain of the second area has a value of 1; and as a result of the average number of edges of the first area or the second area being not less than the reference average number of edges, the first gain parameter calculator is configured to determine the value of the first gain parameter for the first area such that the gain of the first area has a value less than 1 or determine the value of the second gain parameter for the second area such that the gain of the second area has a value less than 1.

10. The display driving apparatus according to claim 1, wherein the distance calculator is configured to convert coordinates of an odd pixel disposed at an odd position in the x-axis direction or the y-axis direction into coordinates of a pixel spaced apart from the odd pixel by a second predetermined distance in the x-axis direction or the y-axis direction without converting coordinates of a pixel disposed at an even position in the x-axis direction or the y-axis direction.

11. The display driving apparatus according to claim 1, wherein the distance calculator is configured to convert coordinates of a first pixel into coordinates of a second pixel spaced apart from the first pixel by a second predetermined distance in one of a +x-axis direction and a −x-axis direction and in one of a +y-axis direction and a −y-axis direction in accordance with a position of the first pixel.

12. The display driving apparatus according to claim 1, wherein the distance calculator is configured to:

convert coordinates of each of pixels disposed at left upper sides of the central pixel disposed at a center of the frame with reference to the central pixel into coordinates of a pixel spaced apart from a left upper pixel by a second predetermined distance in a +x-axis direction or a +y-axis direction, convert coordinates of each of pixels disposed at right upper sides of the central pixel into coordinates of a pixel spaced apart from a right upper pixel by the second predetermined distance in a −x-axis direction or the +y-axis direction, convert coordinates of each of pixels disposed at left lower sides of the central pixel into coordinates of a pixel spaced apart from a left lower pixel by the second predetermined distance in the +x-axis direction or a −y-axis direction, and convert coordinates of each of pixels disposed at right lower sides of the central pixel into coordinates of a pixel spaced apart from a right lower pixel by the second predetermined distance in the −x-axis direction or the −y-axis direction.

13. A display device comprising:

a display panel configured to display a frame constituted by a plurality of pixels; and a display driving apparatus configured to be driven to supply, to the display panel, pixel data respectively corresponding to the plurality of pixels, wherein the display driving apparatus comprises:

a distance calculator configured to calculate distances between respective pixels and a central pixel disposed at a center of the frame;

a gain calculator configured to divide the frame constituted by the plurality of pixels into an interest area and a non-interest area using the distances between the respective pixels and the central pixel, and to determine a gain of each pixel of the plurality of pixels in accordance with an area where the each pixel is disposed; and a gain applier configured to apply the gain of each pixel to input data, thereby generating pixel data, wherein luminance values of the pixels disposed in the interest area have a constant value, wherein luminance values of the pixels disposed in the non-interest area are decreased in proportion to distances between the respective pixels in the non-interest area and the central pixel, and wherein the distance calculator is configured to convert a gain of one pixel into a gain of another pixel spaced apart from the one pixel by a predetermined distance in at least one of an x-axis direction or a y-axis direction.

14. The display device according to claim 13, wherein the gain calculator is configured to determine the interest area and the non-interest area using the distances between the respective pixels and the central pixel and a maximum distance value of the distances between the respective pixels and the central pixel.

15. The display device according to claim 13, further comprising:

an edge detector configured to calculate, for the frame, an average number of edges using an edge detection filter; and a first gain parameter calculator configured to calculate a first gain parameter using the average number of edges in the frame, wherein the decrease of the gains of the pixels disposed in the non-interest area according to the distance between each pixel in the non-interest area and the central pixel is proportional to the first gain parameter.

16. The display device according to claim 13, further comprising:

an edge detector configured to calculate, for the frame, an average number of edges using an edge detection filter; and a first gain parameter calculator configured to calculate a first gain parameter using the average number of edges in the frame, wherein the gain calculator is configured to determine the interest area and the non-interest area using the distances between respective pixels and the central pixel and a maximum distance value of the distances between respective pixels and the central pixel;

wherein the gain calculator is configured to determine the gains of the pixels disposed in the interest area to have a value of 1, and wherein the gain calculator is configured to calculate the gains of the pixels disposed in the non-interest area using the first gain parameter, the distances between the respective pixels and the central pixel, a maximum distance value of the distances between the respective pixels and the central pixel, and a predetermined second gain parameter.

17. The display apparatus according to claim 13, further comprising:

an edge detector configured to calculate, for the frame, an average number of edges using an edge detection filter; and a first gain parameter calculator configured to calculate a first gain parameter using the average number of edges in the frame.

18. The display apparatus according to claim 17, wherein the gain calculator is configured to calculate the gain of each pixel using the first gain parameter (α), the distance (l) between the each pixel and the central pixel, a maximum distance value (max(l)) that is a maximum one of the distances between the respective pixels and the central pixel, and a predetermined second gain parameter (β) in accordance with Expression 1

$$G = \begin{cases} 1, & l < \beta \times \max(l) \\ \frac{-\alpha}{(\max(l))^2}(l - \beta \times (\max(l))^2 + 1, & l \geq \beta \times \max(l) \end{cases}. \quad \text{[Expression 1]}$$

19. The display apparatus according to claim 13, wherein the display apparatus includes a liquid crystal display (LCD), a plasma display panel (PDP) or an organic light emitting diode (OLED).

* * * * *